(No Model.) 2 Sheets—Sheet 1.

E. INGLETON.
TRACTION ENGINE.

No. 549,795. Patented Nov. 12, 1895.

WITNESSES:
H. Walker
J. Fred Acker

INVENTOR
E. Ingleton
BY Munn & Co.
ATTORNEYS.

(No Model.) 2 Sheets—Sheet 2.

E. INGLETON.
TRACTION ENGINE.

No. 549,795. Patented Nov. 12, 1895.

WITNESSES:
H. Walker
Fredk Acker

INVENTOR
E. Ingleton
BY
Munn & Co
ATTORNEYS.

UNITED STATES PATENT OFFICE.

EDWARD INGLETON, OF POTTSTOWN, PENNSYLVANIA.

TRACTION-ENGINE.

SPECIFICATION forming part of Letters Patent No. 549,795, dated November 12, 1895.

Application filed March 13, 1895. Serial No. 541,588. (No model.)

*To all whom it may concern:*

Be it known that I, EDWARD INGLETON, of Pottstown, in the county of Montgomery and State of Pennsylvania, have invented a new and Improved Traction-Engine, of which the following is a full, clear, and exact description.

My invention relates to an improvement in traction-engines; and it has for its object to provide an endless tread for the traction-wheels, whereby the tread of a wheel will be much enlarged over its circumference, and also to provide a means whereby the endless tread may be raised in such manner that the traction-wheel will turn practically on its own center when the engine is being steered.

Another object of this invention is to provide a means whereby the elevation and depression of the endless tread may be accomplished automatically with the operation of the steering apparatus.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
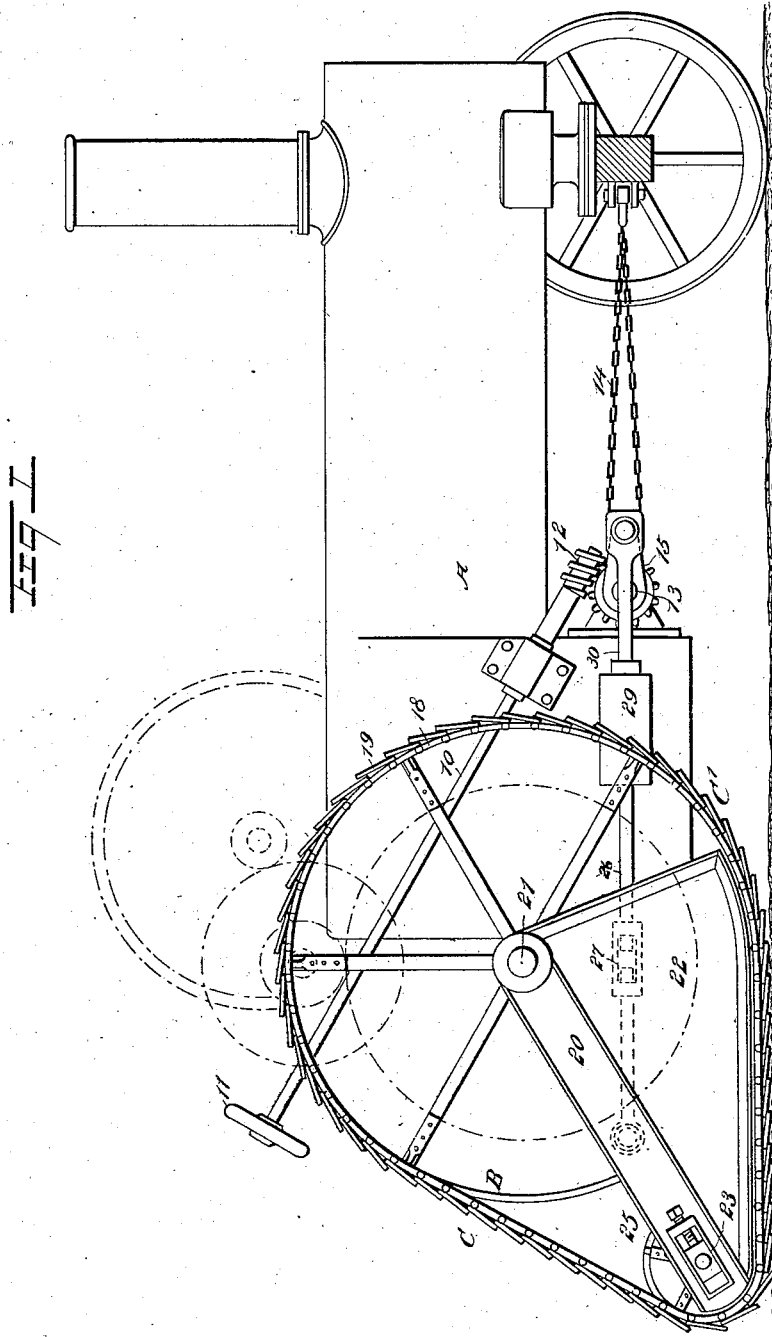
Figure 2:
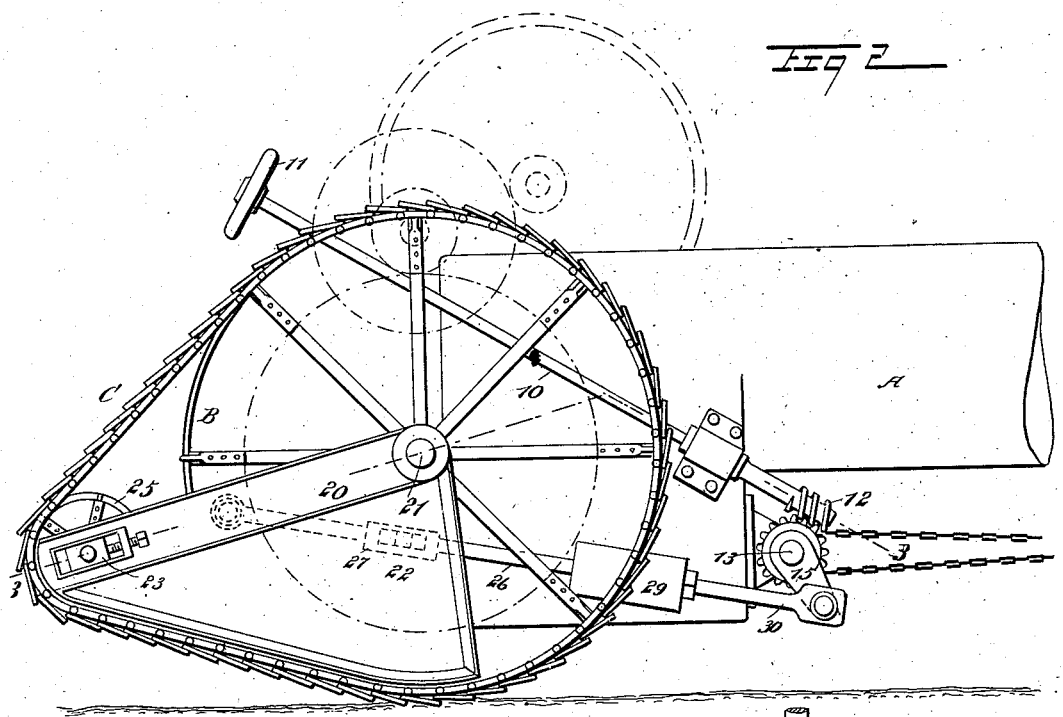
Figure 3:
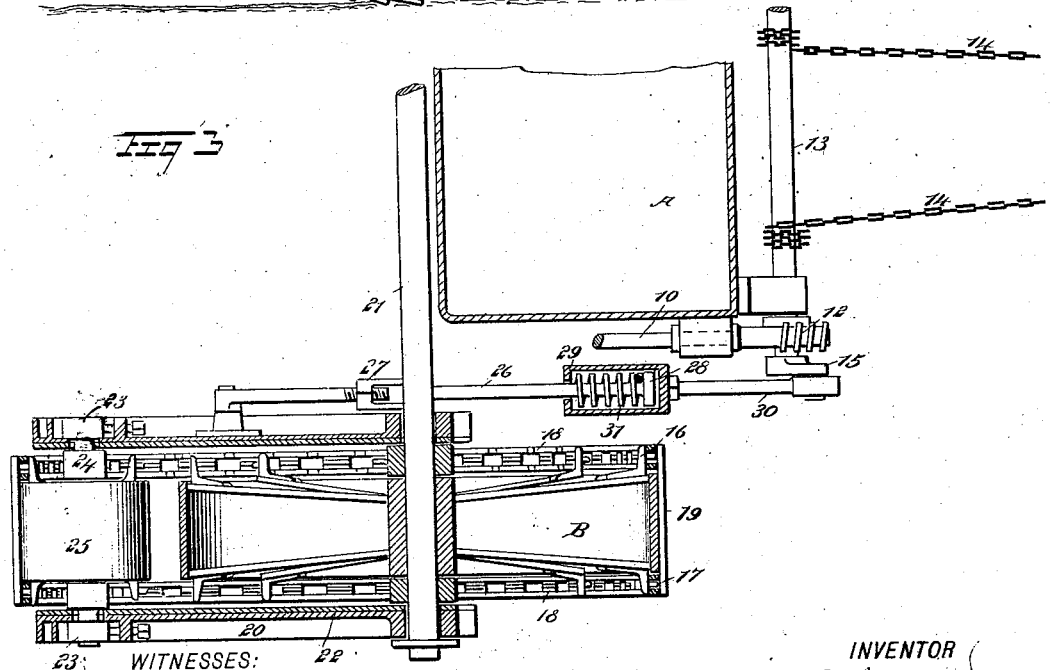
Figure 4:
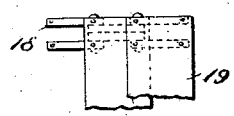

Figure 1 is a side elevation of a traction-engine with the improvements applied, the endless tread being in engagement with the ground throughout its lower stretch. Fig. 2 is a view of the rear portion of the engine, showing the steering-gear in operation to turn the engine and the endless tread elevated in a manner to permit the rear traction-wheels to turn substantially on their own centers. Fig. 3 is a section taken substantially on the line 3 3 of Fig. 2, and Fig. 4 is a detail view of a portion of the endless tread.

In carrying out the invention the traction-engine A may be of the usual or of any approved type, and the steering apparatus may be of the ordinary kind, that shown in the drawings consisting of a steering-shaft 10, having the usual hand-wheel 11 at its rear end and provided at its forward end with a worm 12, the said worm being made to engage with a worm-wheel located upon the winding-shaft 13 of the engine, to which the steering-chains 14 are attached; but this winding-shaft is provided at each end with a crank-arm 15.

The rear traction-wheels B are provided at their peripheries, preferably upon each spoke, with a bracket 16, and these brackets are of angular construction, their horizontal members extending outward from each side of the wheel at a right angle to the spoke and close to the tread of the wheel, the horizontal member of each bracket being fitted with a spur 17. The endless tread C of the wheel comprises two endless chains or link belts 18, which are received by the spurs at each side of the tread of the wheel, and a series of plates 19, loosely connected with the chains, as shown in Fig. 4. These plates are preferably made to overlap, and, since they extend from chain to chain, they have full bearing against the tread of the wheel, and therefore the chains are relieved from any strain. The plates overlap in direction of the rear, so that their free edges point to the front, as shown in Figs. 1 and 2, and by this arrangement the traction-wheels are prevented from slipping and the endless treads have a firm and positive bearing on the ground.

An arm 20 is pivoted upon the axle 21, journaling the traction-wheels, one arm at each side of each wheel. These arms are in the nature of I-beams and extend rearwardly from the axle, and preferably a metal shield 22 is also secured to each arm and is made to extend downward to form a guide for the lower stretches of the endless treads. In each set of arms, at or near their rear ends, an adjustable box 23 is located, and in each pair of boxes the trunnions 24 of a small wheel or pulley 25 are journaled, and each endless tread is made to pass over one of these small wheels, whereby the tread when stretched over a traction-wheel and its attendant pulley-wheel presents somewhat of an oval appearance.

The inner arm 20 of each traction-wheel is pivotally connected with a pitman 26, the said pitman being made in sections connected by turnbuckles 27, in order to take up wear, and the forward end of each pitman is provided with a head 28, which has sliding movement within a cylinder 29, the said cylinder being connected with the rear end of a second pitman 30, the said second pitman being attached to a crank-arm 15 of the winding-shaft of the engine, and a spring 31 is coiled around each rear or sectional pitman within the cylinder 29, bearing against the rear of the pitman-head and the rear of the cylinder, as shown in Fig. 3. Thus it will be observed that the compound pitman is provided with a yielding section, which will prevent jar or injurious motion being communicated from the traction-wheels to the winding-shaft, and it is likewise obvious that when the steering-shaft 10 is manipulated to steer the forward wheels of the engine to the right or to the left the crank-arms will be brought in position to force the supporting-arms 20 of the endless treads proportionately upward, as shown in Fig. 2, leaving the traction-wheels free to turn substantially on their own centers.

Heretofore when endless treads have been employed it has been found almost impossible to properly turn the engine, and especially when the engine is being made to travel over broken or over rough ground.

It will be understood that the wheel 25, which may be termed a "tension-wheel," may be placed in front of the traction-wheel instead of at the rear, as illustrated—as, for instance, the character of the ground may require that part of the weight of the engine should be taken from the front or steering wheels, and by placing the tension-wheel forwardly this object will be attained. It will also be understood that the tension-wheel may be placed at any angle to the axis of the traction-wheel.

Having thus described my invention, I claim as new and desire to secure by Letters Patent—

1. In a traction engine, an endless tread for the traction wheels, and means, substantially as described, for raising and lowering a section of the tread from the steering gear of the engine, as and for the purpose specified.

2. The combination, with the traction wheel of an engine, of an endless tread carried by the traction wheel, and a tension wheel likewise engaging with the tread and adapted to be raised and lowered to entirely clear the section of tread between the tension wheel and traction wheel from the ground while turning the engine, for the purpose specified.

3. In a traction engine or like machine, a tension wheel capable of being raised and lowered to entirely clear from the ground a section of the tread and also controlling the length of the tread, substantially as described.

4. The combination, with the traction wheel of an engine, of an endless tread carried by the traction wheel and consisting of chains and overlapping plates, pivoted arms extending beyond the said wheel, carrying at their ends a pulley likewise engaging with the endless tread, and means, substantially as described, for raising the said arms, whereby the tread may be elevated, causing the tread to conform to the lower portion of the traction wheel, as and for the purpose specified.

5. In a traction engine, the combination, with the traction wheel, upwardly swinging arms fulcrumed upon the axle of the wheel and extending beyond said wheel, and guards extending downward from the said arms, of an endless tread partially encircling the traction wheel and substantially engaging with the lower portion of the said guards, a tension wheel journaled in the said arms and engaging with the endless tread, and means for raising the arms, as and for the purpose specified.

6. In a traction engine, the combination, with the steering gear, the traction wheel, arms pivoted upon the axle and extending rearwardly from the wheel, carrying at their rear ends a tension pulley, and a lifting connection between the said arms and the steering gear, of an endless tread carried by the traction wheel and the said tension wheel, as and for the purpose set forth.

7. An endless tread for traction engines, the same consisting of endless chains and plates connecting the chains, said plates being arranged to overlap, substantially as set forth.

8. In a traction engine, the combination with a traction wheel, the endless tread, and the winding shaft of a steering gear, of the tension wheel and a lifting mechanism comprising a longitudinally yielding connection between the tension wheel and winding shaft, substantially as set forth.

EDWARD INGLETON.

Witnesses:
C. SEDGWICK,
J. FRED. ACKER.